Feb. 9, 1926. 1,572,320
J. H. SHAW
LOCK FOR GEAR SHIFT LEVERS AND THE LIKE
Filed Dec. 1, 1919 2 Sheets-Sheet 1
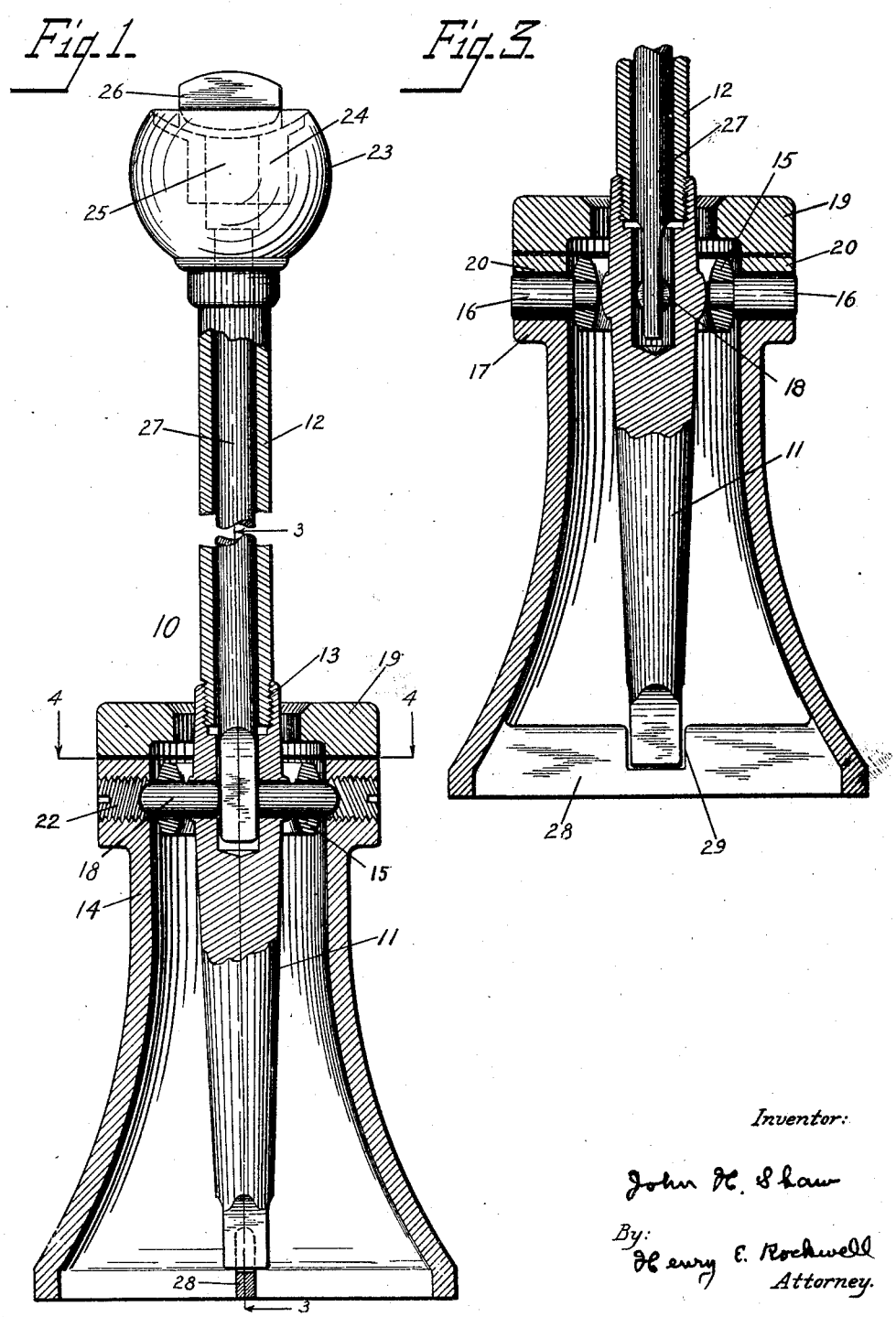
Inventor:
John H. Shaw
By: Henry E. Rockwell
Attorney.

Feb. 9, 1926. 1,572,320
J. H. SHAW
LOCK FOR GEAR SHIFT LEVERS AND THE LIKE
Filed Dec. 1, 1919   2 Sheets-Sheet 2
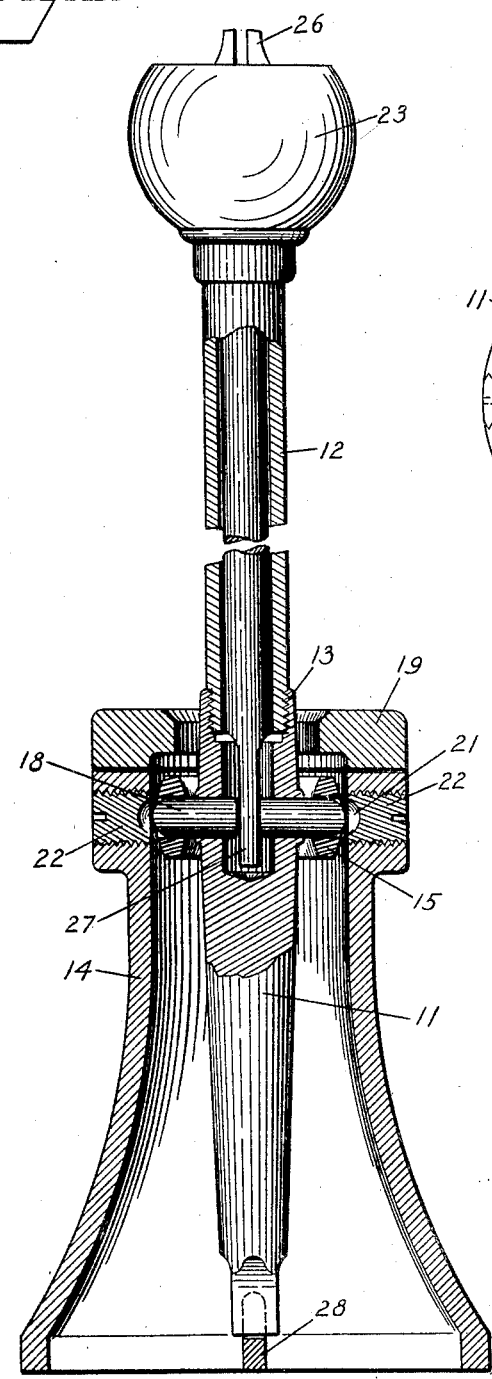
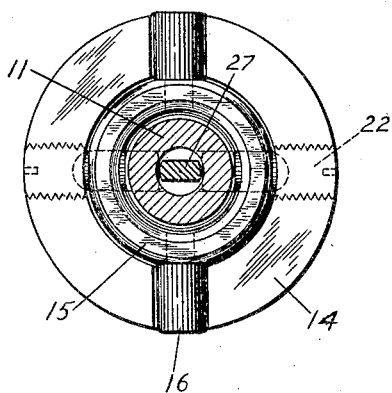
Inventor:
John H. Shaw
By: Henry E. Rockwell
Attorney.

Patented Feb. 9, 1926.

1,572,320

UNITED STATES PATENT OFFICE.

JOHN H. SHAW, OF NEW HAVEN, CONNECTICUT, ASSIGNOR TO SARGENT & COMPANY, OF NEW HAVEN, CONNECTICUT, A CORPORATION OF CONNECTICUT.

LOCK FOR GEAR-SHIFT LEVERS AND THE LIKE.

Application filed December 1, 1919. Serial No. 341,618.

*To all whom it may concern:*

Be it known that I, JOHN H. SHAW, a citizen of the United States, residing in the city and county of New Haven, State of Connecticut, have invented certain new and useful Improvements in Locks for Gear-Shift Levers and the like, of which the following is a full, clear, and exact description.

This invention relates to a lever lock and more particularly to a key-controlled locking device for locking the gear shift lever of an automobile against unauthorized manipulation.

The primary object of my invention is to provide a gear shift lever of the gimbal bearing type with key-controlled means for locking the lever in its neutral position.

A more specific object of my invention is to provide a gear shift lever with key-controlled means for forcing a pair of lever supporting trunnions outward into locking engagement with the lever supporting bracket.

To these and other ends the invention consists in the novel features and combinations of parts to be hereinafter described and claimed.

In the accompanying drawings:

Fig. 1 is a vertical sectional view through a gear shift lever and its supporting bracket embodying my invention, the parts being shown in their locked position.

Fig. 2 is a view similar to Fig. 1, but showing the parts in their unlocked position.

Fig. 3 is a vertical sectional view taken on the line 3—3 of Fig. 1; and

Fig. 4 is a horizontal sectional view taken substantially on the line 4—4 of Fig. 1.

In the embodiment of my invention illustrated in the drawings, I have used the numeral 10 to designate the gear shift lever consisting of a lower portion 11 and an upper tubular portion 12 having threaded engagement with the portion 11, as indicated by 13. I have shown the gear shift lever as swingingly mounted within its supporting casing by what is known as a gimbal bearing consisting of trunnions extending at right angles to each other. The gimbal bearing for swingingly supporting the lever 10 within its bracket 14 consists of a swinging lever-support comprising a ring 15 provided with the oppositely extending trunnions 16 mounted within the bearings 17, so that this ring is free to rock upon its trunnions 16, and the portion 11 of the gear shift lever is in turn swingingly mounted within the ring 15 by the oppositely extending trunnions 18 positioned at right angles to the trunnions 16, the arrangement being such that the gear shift lever 10 is normally free to rock in any direction upon its supporting bearing in a well-known manner. In order to retain the gimbal bearing properly seated within the supporting bracket 14, I provide the ring or collar 19 with the downwardly extending lugs 20, which lugs are constructed to engage the rounded upper surface of the trunnion 16, the collar 19 preferably being secured to its bracket 14 by screws or the like (not shown).

The lever supporting means so far described is old and well-known. My invention consists in the means which I will now describe for locking the lever 10, so that it cannot be rocked upon its supporting trunnions, and in order to accomplish this object, the supporting trunnions 18 are slidably mounted within the gear shift lever 11 and the rocking ring 15, and opposite the outer ends of these trunnions 18 are preferably formed relatively shallow concaved pockets 21 within the supporting bracket 14. These pockets in the embodiment of my invention illustrated are provided by forming the same in the inner end of the threaded bolts 22, which are screwed into the threaded sockets formed within the bracket 14. The sliding trunnions 18 are so constructed that they may be forced outwardly to seat the outer ends of the same in the pockets 21. The object in making the pockets 21 rather shallow and concaved is to cause the curvature of these pockets to force the sliding trunnions inward to their retracted position whenever it is attempted to shift the lever 10 after the rod 27 has been turned to its unlocked position. The outer ends of the trunnions 18 are preferably rounded to conform to the curvature of the pockets 21.

In order to provide key-controlled means for forcing the sliding trunnions 18 outward into locking engagement with the pockets 21, I have provided within the knob 23 upon the upper end of the gear shift lever 10 the cylinder lock 24 having a key barrel 25 rotatably mounted therein, which key barrel may be rotated by means of the head 26 formed upon the outer end of the same. Within the tubular portion 12 of the gear shift lever is rotatably mounted a rod 27, the upper end of which is rigidly secured to the key barrel 25, and the lower end has its opposite sides cut away, as shown, so that the lower end of this rod 27 is substantially rectangular in cross-section, as shown in Fig. 4, the arrangement being such that when the rod is turned to the position shown in Fig. 2, the sliding trunnions 18 are permitted to move inward, as shown in this figure, out of engagement with the pockets 21, so that the gear shift lever 10 is free to be shifted as may be desired. When it is desired to lock this lever in its neutral position, the rod 27 is rotated by means of its key barrel to the position shown in Fig. 1, so that the trunnions 18 are forced outward by means of the lower end of the rod 27 into the pockets 21 to prevent the ring 15 from being rocked upon its trunnions 16.

From the mechanism just described, it will be seen that my locking means operates to prevent the gear shift lever 10 from being rocked upon one pair of its supporting trunnions, thus limiting the rocking movement of the lever to a single vertical plane. In the embodiment of my invention illustrated, I have shown a guide 28 mounted within the lower portion of the supporting bracket 14, and this guide is provided with the notch 29 positioned to receive the lower end of the gear shift lever 11 when the same is in its neutral position. This guide 28 is positioned within its bracket to prevent the lever from being shifted in a forward or rearward direction until it has first been moved slightly in a lateral direction, and in the embodiment of my invention illustrated, I have shown the sliding trunnions 18 positioned to prevent the lever 10 from being moved in a lateral position sufficiently to disengage its lower end from the notch 29 after the trunnions 18 have been forced outward into locking engagement with the bracket 14. As just stated, the sliding trunnions 18 are positioned to prevent the lever 10 from being rocked laterally when these trunnions are moved into engagement with the bracket 14, but obviously, if desired, these trunnions might be positioned to lie in a plane at right angles to that illustrated in the drawings to thereby prevent the lever 10 from being rocked in a forward and rearward direction irrespective of the operation of the guide 28.

It will be apparent that various minor changes may be made in the device herein described without departing from the scope of my invention as defined in the annexed claims.

What I claim is:

1. In combination with a gear shift lever, a bracket swingingly supporting the same, supporting trunnions for said lever extending at right angles to each other, one pair of trunnions movable axially, and key operable means for sliding said trunnions into locking engagement with said bracket to lock said lever.

2. In combination with a gear shift lever, a supporting bracket, trunnions extending at right angles to each other for swingingly supporting said lever upon said bracket, and key-controlled means for forcing one pair of trunnions outward into locking engagement with said bracket to lock said lever.

3. In combination with an operating lever, a supporting bracket, a lever support swingingly mounted upon said bracket, trunnions for swingingly supporting said lever upon said support, and key-controlled means for forcing said trunnions outward into locking engagement with said bracket to lock said lever against movement.

4. In combination with a gear shift lever, a supporting bracket, a supporting ring rockingly mounted upon said bracket, trunnions for swingingly mounting said lever within said ring, and key-controlled means for rigidly securing said ring to said bracket to thereby prevent the operation of said lever.

5. In combination with an operating lever, a supporting bracket, a supporting ring rockingly mounted upon said bracket, trunnions for swingly mounting said lever within said ring, and key-controlled means for forcing said trunnions outwardly into locking engagement with said bracket to render said lever inoperative.

6. In combination with an operating lever, a supporting bracket, trunnions extending at right angles to each other for swingingly supporting said lever upon said bracket, and key-controlled means movable into position to block the swing of said lever upon one pair of its supporting trunnions.

7. In combination with a gear shift lever, a supporting bracket, trunnions extending at right angles to each other for swingingly supporting said lever within said bracket, one pair of trunnions slidably mounted within said lever, and key-controlled means rotatably mounted within said lever and constructed to force said sliding trunnions outward into locking engagement with said bracket to thereby lock said lever against movement.

8. In combination with a gear shift lever, a supporting bracket, trunnions extending at right angles to each other for swingingly supporting said lever within said bracket, one pair of trunnions slidably mounted within said lever, said bracket having relatively shallow concave pockets formed therein and positioned to receive the ends of said sliding trunnions, and key-controlled means for forcing said trunnions outward into said pockets to lock said lever against movement.

9. In combination, an operating lever, a supporting bracket therefor, a lever support swingingly mounted upon said bracket, said operating lever being swingingly mounted upon said lever support, and key-controlled means mounted in the lever for locking said lever support against movement.

10. In combination, a supporting bracket, a swinging lever-support mounted thereon, an operating lever carried by said lever-support and key-controlled means engaging said lever support and lever to support the latter and movable into engagement with the bracket for locking said lever-support against movement.

11. In combination with an operating lever, a supporting bracket, pairs of trunnions mounting said operating lever thereon, one pair of said trunnions being movable into position to lock the lever against movement about the other pair and key-controlled means for moving said trunnions into said position.

12. In combination, a supporting bracket, a lever, means including a pair of trunnions to swingingly mount said lever on said bracket and key-controlled means to move said trunnions into locking engagement with said bracket.

13. In combination, a supporting bracket, a lever support swingingly mounted thereon, an operating lever, a pair of trunnions mounting said lever on said support and movable into position to lock said support against movement.

14. In combination, a supporting bracket, a lever support swingingly mounted thereon, an operating lever, and common means for supporting said lever on said support and locking said support against movement.

15. In combination, a supporting bracket, a ring rockingly mounted thereon, a lever passing through said ring and pivotally carried thereby, and key controlled means for locking said ring against movement relatively to the support.

16. In combination, a supporting bracket, a ring rockingly mounted thereon, a lever passing through said ring and pivotally carried thereby, and key controlled means mounted in the lever for locking said ring against movement relatively to the support.

In witness whereof, I have hereunto set my hand on the 28th day of November, 1919.

JOHN H. SHAW.